United States Patent
Sun

(10) Patent No.: US 10,676,355 B2
(45) Date of Patent: Jun. 9, 2020

(54) DEVICE FOR COOLING A FLUID

(71) Applicant: SANDVIK MATERIALS TECHNOLOGY DEUTSCHLAND GMBH, Düsseldorf (DE)

(72) Inventor: Dehua Sun, Backnang (DE)

(73) Assignee: IPCO GERMANY GMBH, Fellbach (DE)

( * ) Notice: Subject to any disclaimer, the term of this patent is extended or adjusted under 35 U.S.C. 154(b) by 481 days.

(21) Appl. No.: 15/521,120

(22) PCT Filed: Oct. 16, 2015

(86) PCT No.: PCT/EP2015/073994
§ 371 (c)(1),
(2) Date: Apr. 21, 2017

(87) PCT Pub. No.: WO2016/062628
PCT Pub. Date: Apr. 28, 2016

(65) Prior Publication Data
US 2017/0334720 A1    Nov. 23, 2017

(30) Foreign Application Priority Data
Oct. 23, 2014   (DE) ........................ 10 2014 221 497

(51) Int. Cl.
*C01B 17/02* (2006.01)
*F24H 9/00* (2006.01)
*F28D 1/053* (2006.01)

(52) U.S. Cl.
CPC .......... *C01B 17/0216* (2013.01); *F24H 9/001* (2013.01); *F28D 1/053* (2013.01)

(58) Field of Classification Search
CPC ..... C01B 17/02; C01B 17/0216; F24H 9/001; F28D 1/053
See application file for complete search history.

(56) References Cited

U.S. PATENT DOCUMENTS

| | | |
|---|---|---|
| 1,467,867 A | 9/1923 | Mauch |
| 1,742,391 A | 1/1930 | Hanson et al. |
| 1,773,249 A | 8/1930 | Yeager |
| 2,109,926 A | 3/1938 | Nelson |
| 3,718,708 A | 2/1973 | Ozawa et al. |
| 3,795,490 A | 3/1974 | Ozawa et al. |
| 4,139,347 A | 2/1979 | Tse |
| 7,524,177 B2 | 4/2009 | Lupke et al. |
| 8,895,901 B2 | 11/2014 | Wortmann et al. |
| 2001/0011460 A1 | 8/2001 | Tchougounov et al. |
| 2012/0292303 A1 | 11/2012 | Wortmann et al. |

FOREIGN PATENT DOCUMENTS

| | | |
|---|---|---|
| CA | 2 835 271 A1 | 11/2012 |
| CN | 1886247 A | 12/2006 |
| DE | 1 012 426 | 7/1957 |
| DE | 2 035 630 | 2/1971 |
| DE | 199 41 901 A1 | 3/2001 |
| GB | 1 377 980 | 12/1974 |
| WO | WO 2012/156472 A1 | 11/2012 |

OTHER PUBLICATIONS

Notification of Transmittal of International Search Report issued in Application No. PCT/EP2015/073994 dated Dec. 23, 2015 (1 page).
International Search Report issued in Application No. PCT/EP2015/073994 with English translation, dated Dec. 23, 2015 (8 pages).
Written Opinion of International Searching Authority issued in Application No. PCT/EP2015/073994 dated Dec. 23, 2015 (6 pages).
Office Action of German Patent Office issued in Application No. 10 2014 221 497.1 dated Aug. 26, 2015 (7 pages).
Office Action of Chinese Patent Office issued in Application No. 201580057399.X with English translation dated Nov. 29, 2018 (14 pages).

*Primary Examiner* — Edward M Johnson
(74) *Attorney, Agent, or Firm* — Flynn Thiel, P.C.

(57) ABSTRACT

A device for cooling a fluid that solidifies in a predefined temperature range, in particular a melt. The device has a cooling chamber for receiving or conveying a coolant, at least one pipeline for the fluid, at least a section of which is arranged within the cooling chamber, and at least one heating device arranged within the pipeline.

17 Claims, 5 Drawing Sheets

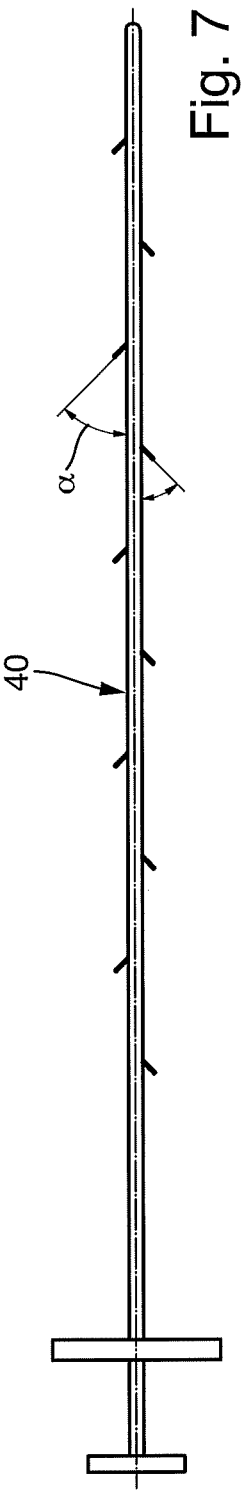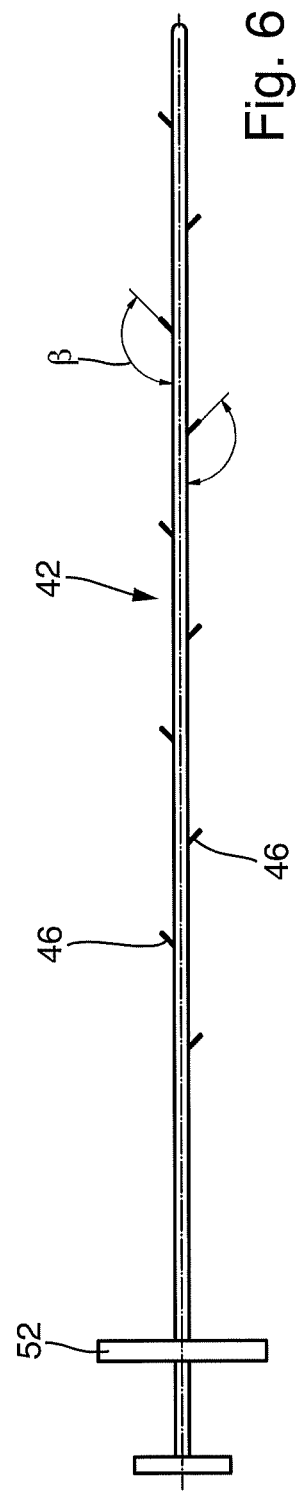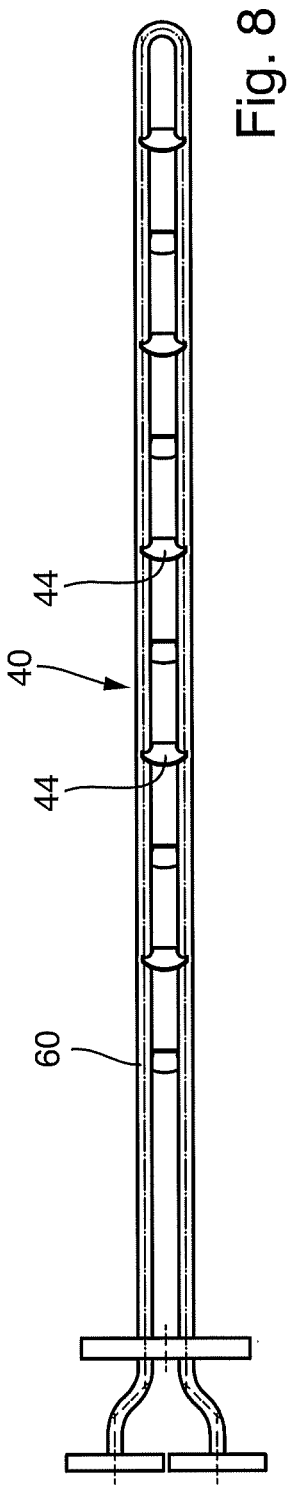

DEVICE FOR COOLING A FLUID

Figure 1:
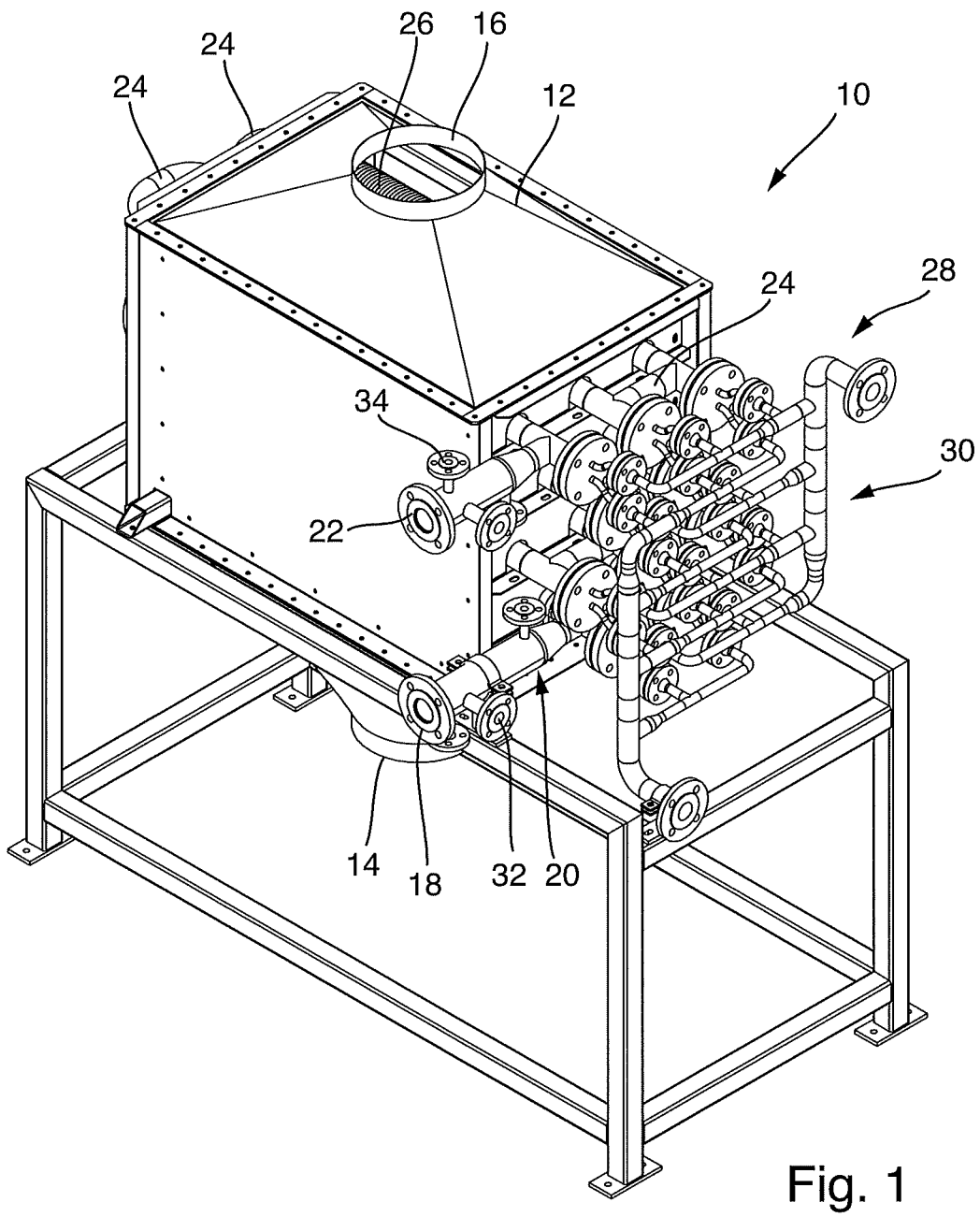

The invention relates to a device for cooling a fluid that solidifies in a predefined temperature range, in particular a melt, having a cooling chamber for receiving or conveying a coolant, and at least one pipeline for the fluid, at least a section of which is arranged within the cooling chamber. The invention also relates to a method for cooling a fluid that solidifies in a predefined temperature range, in particular a melt, having the steps of routing the fluid through at least one pipeline of a cooler, wherein the pipeline is surrounded by a coolant, and detecting a temperature of the fluid in the region of the pipeline.

The invention is intended to improve a device and method for cooling a fluid that solidifies in a predefined temperature range.

To that end, the invention provides a device having the features of claim 1 and a method having the features of claim 15. Advantageous embodiments are indicated in the dependent claims.

Thus, the invention provides a device for cooling a fluid that solidifies in a predefined temperature range, in particular a melt, having a cooling chamber for receiving or conveying a coolant, at least one pipeline for the fluid, at least a section of which is arranged within the cooling chamber, wherein there is provided at least one heating device arranged within the pipeline.

When cooling fluids that solidify in a predefined temperature range, it is necessary to always ensure that the fluid does not solidify inside the cooler itself but is cooled only to the point that it remains flowable. Partial solidification is also critical since deposits can, over time, lead to blockages in the cooler. Of particular importance is this type of solidification within the cooler in the context of melts and in particular when cooling liquid sulfur. For the pastillation of sulfur, it is optimal to supply the still-liquid sulfur to a droplet former at a temperature which is only slightly above the solidification temperature of sulfur. However, this can be problematic if the temperature within the cooler drops too far since this risks solidification within the cooler and thus blockages. The invention provides a remedy here by a heating device being arranged within the pipeline running through the cooling chamber. Now, if the temperature of the fluid, in particular the liquid sulfur, within the pipeline drops below a predefined temperature value, the heating device is activated. The fluid within the pipeline is thus heated by the heating device and it is not only possible to prevent further solidification of the fluid in the pipeline, but even to re-melt existing solidifications within the pipeline. Surprisingly, the provision of heating devices is of great advantage in that context, in particular if liquid sulfur is to be cooled. This is because the invention makes it possible, for the first time ever, to cool the sulfur to an optimal temperature for pastillation without having to run the risk of solidifications within the cooler.

In an embodiment of the invention, the heating device is designed as a heating line.

For example, hot water or steam can be conveyed through the heating line in order to thus very rapidly heat the fluid within the pipeline and possibly re-melt solidifications.

In an embodiment of the invention, the heating line has a U-shaped profile and is designed as a heating lance that can be inserted into the pipeline.

The provision of a U-shaped heating line makes it possible to convey the heating medium, for example water or steam, in a circuit through the heating lance. Providing a heating lance that can be inserted into the pipeline makes it possible for the device according to the invention to be readily produced and above all also maintained and cleaned.

In an embodiment of the invention, the heating device is designed as an electric heating rod.

An electric heating rod can also serve to heat the fluid in the pipeline reliably and quickly, and where necessary to re-melt solidifications. The electric heating rod can also be designed in the form of a heating lance that can be inserted into the pipeline.

In an embodiment of the invention, the heating device is provided with baffles.

The provision of baffles on the heating device can improve a transfer of heat, on one hand between the pipeline and the fluid to be cooled and also on the other hand between the heating device and the fluid. On one hand, this ensures better cooling, and on the other hand it also ensures more rapid heating if there is a risk of solidifications within the pipeline.

In an embodiment of the invention, the baffles are arranged between the legs of the U-shaped heating line.

This makes it possible to ensure a very good transfer of heat between the baffles and the heating line, and at the same time a mechanically very stable attachment of the baffles to the heating line. The baffles are thus heated together with the heating line and, if necessary, provide rapid heating of the fluid within the pipeline in order to prevent solidifications.

In an embodiment of the invention, the baffles are oriented at an angle between 30° and 60°, in particular 45°, counter to the flow of the fluid in the pipeline.

Such an arrangement of the baffles has proven particularly advantageous since it is thus possible to ensure a good transfer of heat between the pipeline and the fluid on one hand, and also between the heating line and the baffles and the fluid on the other hand.

In an embodiment of the invention, the baffles are welded to or formed integrally with the heating line.

This makes it possible to achieve a very good transfer of heat between heating line and the baffles and at the same time a stable mechanical attachment.

In an embodiment of the invention, the pipeline has multiple straight sections guided through the cooling chamber.

It has proven particularly advantageous to arrange multiple straight sections of the pipeline in the cooling chamber in order to thus make best use of the cooling chamber. By contrast, redirecting sections between the individual straight sections are advantageously arranged outside the cooling chamber. This makes the device according to the invention easy to assemble and above all the pipelines are easily accessible for any maintenance or cleaning.

In an embodiment of the invention, the multiple straight sections in the cooling chamber are arranged in multiple layers one above the other, wherein at least one layer consists of at least two straight pipe sections arranged next to one another, and wherein the pipe sections of adjacent layers are arranged offset with respect to one another.

This makes it possible, on one hand, to achieve a very space-saving arrangement of the straight sections of the pipelines and, on the other hand, to select an arrangement that is very advantageous for the throughflow of cooling air or coolant perpendicular to the straight pipe sections. This is because such an arrangement avoids the straight pipe sections being arranged in the wind shadow of other pipe sections. This makes it possible to achieve a very good and even cooling action of the cooling air or of the coolant on all pipe sections.

In an embodiment of the invention, at least certain sections of the pipeline are provided externally with cooling fins.

In this way it is possible to improve a transfer of heat between the coolant and the pipeline.

In an embodiment of the invention, the coolant is air.

Air as coolant is usually readily available and it is not necessary to consider a closed circuit for the coolant.

In an embodiment of the invention, the heating line is supplied with hot water or steam.

According to the invention, the heating line is activated only when there is a risk of solidifications within the pipeline. In such a case, rapid heating of the fluid is advantageous in order to rapidly avert the danger of solidifications or to rapidly re-melt existing solidifications. The use of hot water or hot steam can ensure such rapid heating of the heating lines.

In an embodiment of the invention, the pipeline is provided with at least one flange for attaching a flange of the heating device.

This makes it possible for the heating device, which is advantageously designed as a heating lance, to be particularly simple to assemble. For example, the flange of the pipeline is provided in the continuation of a straight pipe section such that the heating device can easily be inserted.

The problem upon which the invention is based is also solved with a method for cooling a fluid that solidifies in a predefined temperature range, in particular a melt, wherein the steps of routing the fluid through at least one pipeline of a cooler, wherein the pipeline is surrounded by a coolant, and detecting a temperature of the fluid in the region of the pipeline, and heating the fluid in the pipeline by means of a heating device which is arranged within the pipeline in the event of the fluid in the region of the pipeline dropping below a predefined temperature, are provided.

Thus, according to the invention, the heating device is activated only when the fluid to be cooled drops below a predefined temperature in the region of the pipeline, and there is thus the risk of solidifications within the pipeline. It is thus possible for a fluid, for example liquid sulfur, to be cooled to just above a temperature range in which the liquid sulfur solidifies. This is only possible because the heating device can be used to immediately counteract this and re-heat the liquid sulfur if there is a risk of solidifications within the pipeline. The method according to the invention thus makes it possible to cool a fluid, in particular a melt and for example liquid sulfur, to just above the predefined temperature range in which the fluid solidifies. This makes it possible to greatly improve subsequent processing, following the cooling of the fluid. In the case of liquid sulfur, it is thus possible to greatly improve pastillation of the liquid sulfur in a droplet former.

In an embodiment of the invention, there is provision for generating turbulence within the pipeline.

Generating a turbulent flow of the fluid within the pipeline ensures, on one hand, a good transfer of heat between the pipeline and the fluid and also, on the other hand, a good transfer of heat between the heating device and the fluid.

In an embodiment of the invention, there is provision for heating baffles arranged on the heating device.

This makes it possible to heat the fluid within the pipeline even more quickly in the event of imminent solidifications since the surface area of the baffles is available in addition to the surface area of the heating device for the transfer of heat.

Figure 2:
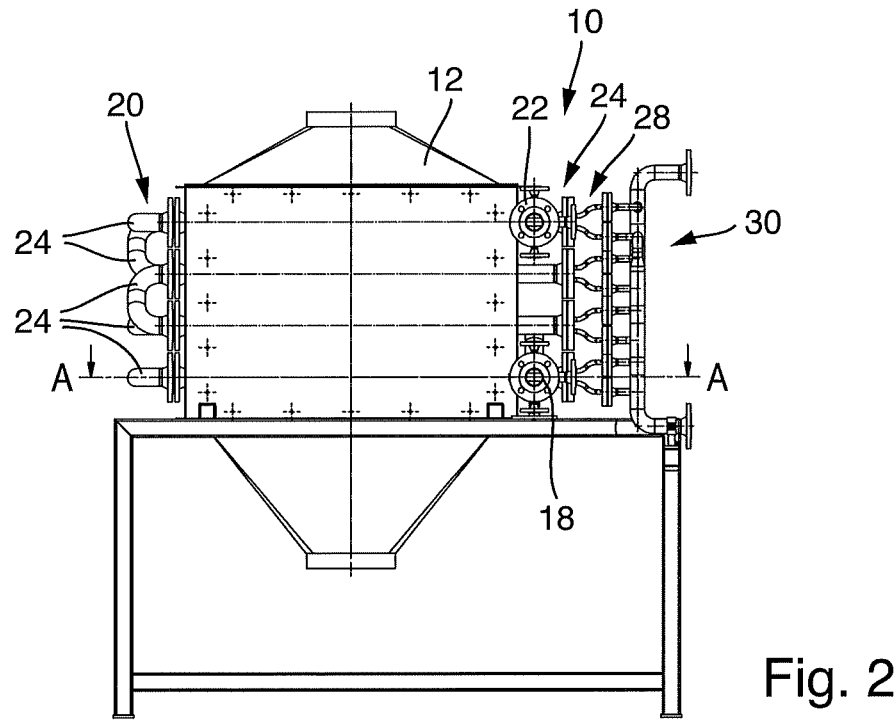
Figure 3:
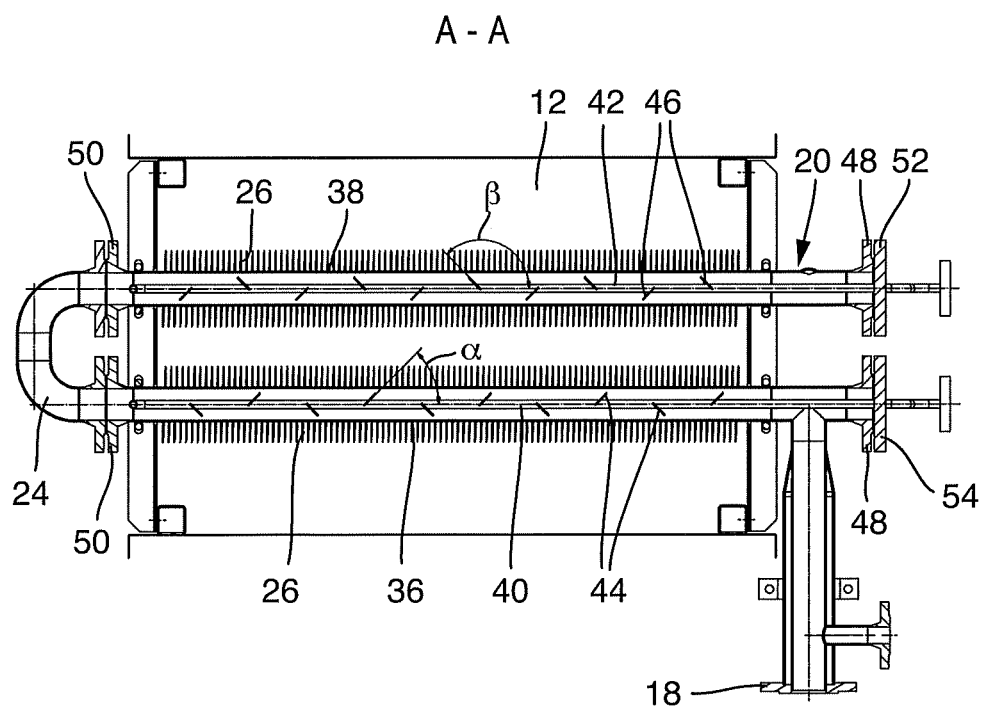
Figure 4:
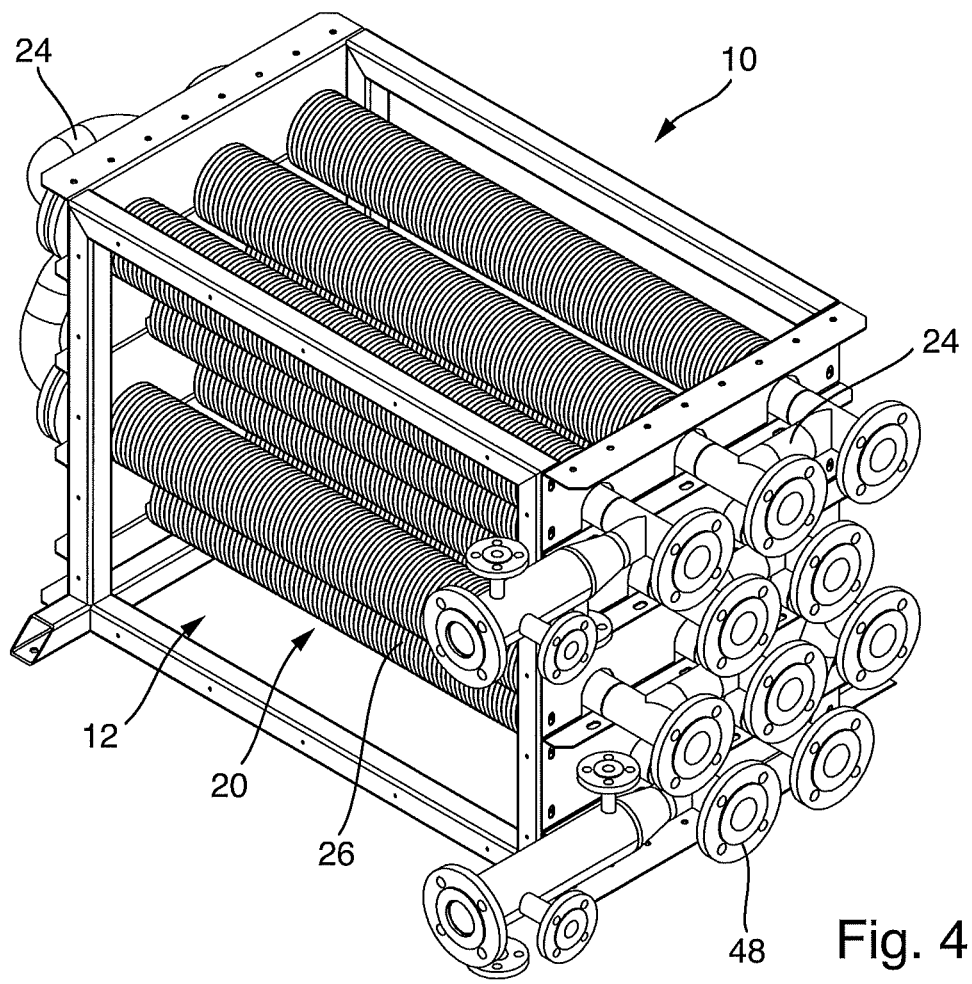
Figure 5:
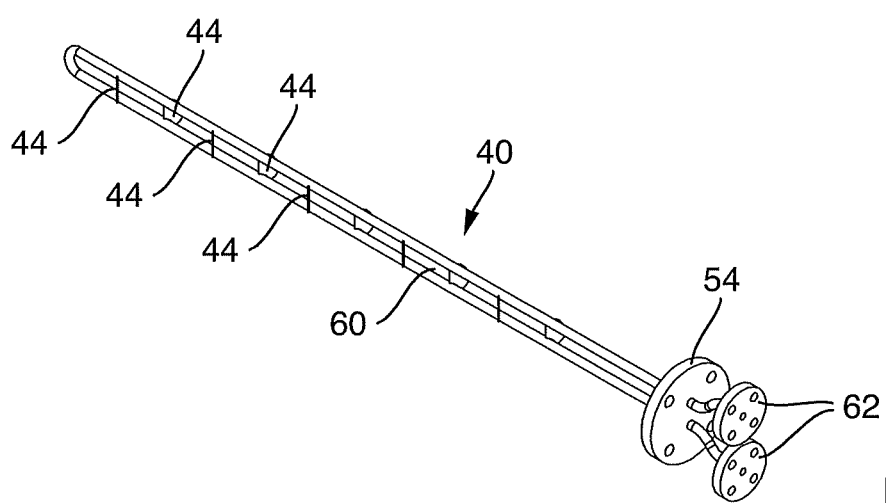
Figure 9:
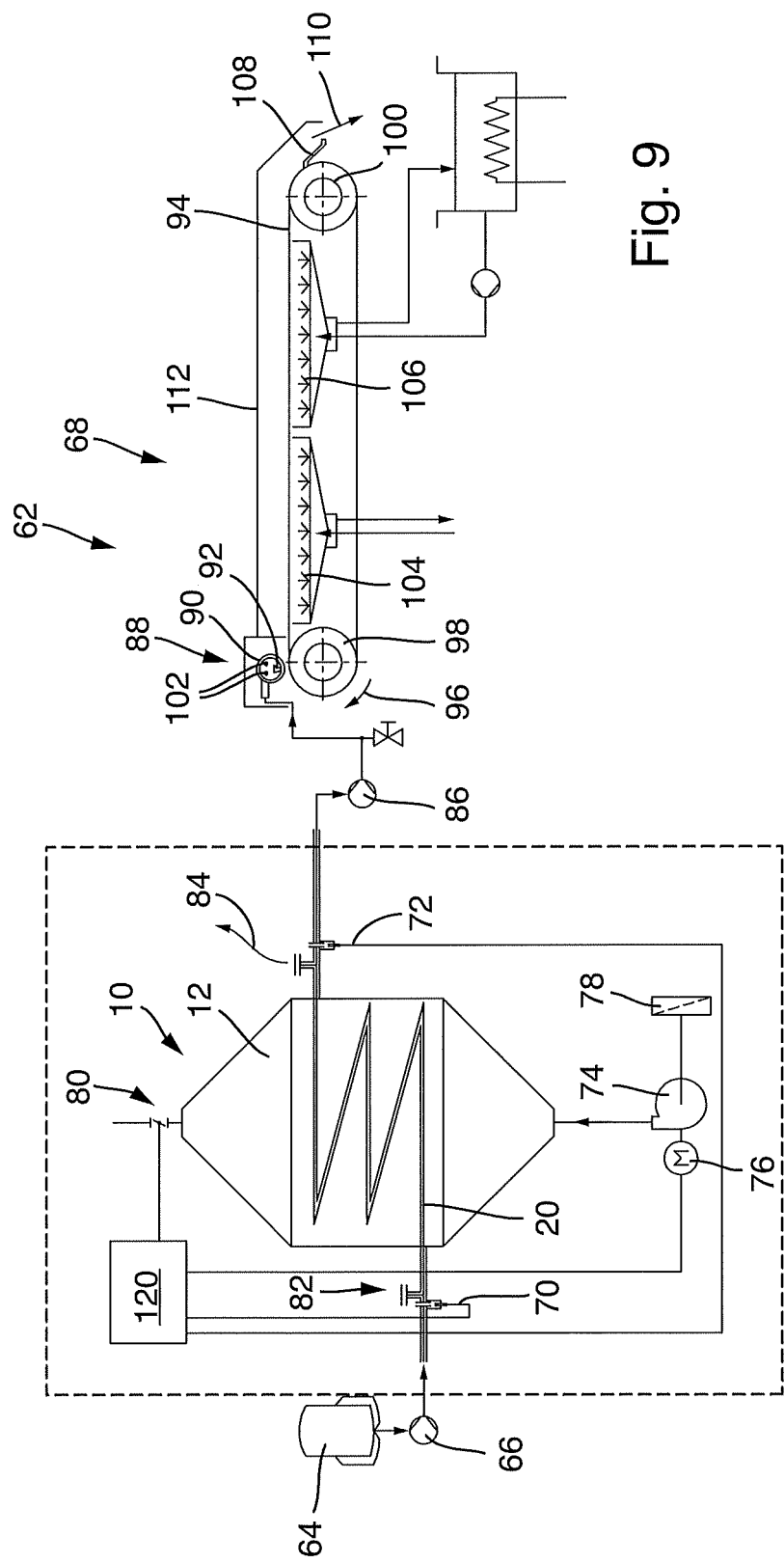

Further features and advantages of the invention can be derived from the claims and the following description of preferred, embodiments of the invention in conjunction with the drawings. Individual features of the various embodiments can be combined with one another in any way without departing from the scope of the invention. In the drawings:

FIG. 1 is an oblique top view of a device according to a first embodiment of the invention, FIG. 2 is a side view of the device of FIG. 1, FIG. 3 is a plan view of the section plane A-A in FIG. 2, FIG. 4 is a view of the device of FIG. 1 in a partially dismantled state, FIG. 5 is an oblique top view of a heating lance for the device of FIG. 1, FIG. 6 is a plan view of a second heating lance for the device of FIG. 1, FIG. 7 is a plan view of the heating lance of FIG. 5, FIG. 8 is a side view of the heating lance of FIG. 5, and FIG. 9 is a schematic illustration of an arrangement for pastillating sulfur, with the cooling device according to the invention.

The illustration of FIG. 1 shows a device 10 according to the invention for cooling a fluid, in particular liquid sulfur. However, the device 10 can for example also be used for other melts or other fluids which solidify within a predefined temperature range. Examples of other fluids are mixtures of solids and liquids, referred to as slurries.

The device 10 has a cooling chamber 12 which is bounded by side walls, a base and a lid. The base and the lid each have an air inlet opening, 14 and 16 respectively, via which cooling air is passed through the cooling chamber 12. For the sake of clarity, fans for delivering the cooling air are not shown in FIG. 1.

A fluid that is to be cooled, for example liquid sulfur, is introduced into an inlet end 18 of a pipeline 20 which follows a sinuous course and ends at an outlet end 22. In that setup, the pipeline 20 has multiple straight sections which are arranged within the cooling chamber 12, and multiple redirecting sections 24 which are arranged outside the cooling chamber 12. Within the cooling chamber, the straight sections of the pipeline 20 are provided with cooling fins 26 in order to ensure a good transfer of heat between the cooling air in the cooling chamber 12 and the pipeline 20.

Heating lances 28, which are visible only in part in the illustration of FIG. 1 and are supplied with hot steam, are inserted into each of the straight sections of the pipeline 20. The hot steam is fed into the heating lances 28 via pipelines 30. The figure shows only part of the pipelines 30, which are connected to a steam circuit (not shown).

The device 10 is intended to cool a fluid, in particular liquid sulfur or other melts, to a temperature which is only slightly higher than a temperature range in which the fluid or the melt solidifies. This cooling of the fluid is effected by means of the cooling air that is passed through the cooling chamber 12. Owing to cooling to immediately above the temperature range in which the fluid solidifies, there is the risk of the fluid solidifying even in the pipeline 20, thus blocking the latter or being supplied in the partially solidified state to a subsequent processing stage, for example pastillation. The heating lances 28 are provided in order to avoid this and thus permit cooling of the fluid to immediately above the temperature range in which the fluid solidifies. The fluid temperature is measured at the inlet end 18 of the pipeline 20 and at the outlet end 22 of the pipeline. Flanges 32 and 34, into which a temperature sensor can be inserted, are provided at each of these ends. If the temperature at the outlet end 22 drops below a predefined value, a control unit (not shown) recognizes that there is a risk of solidifications in the pipeline 20. In this case, the pipelines 30 and thus the heating lines 28 are charged with hot steam in order to raise the temperature of the fluid within the pipeline 20, and thus avert the danger of solidifications, and also in order to re-liquefy any existing solidifications.

By virtue of the provision of heating lines within the pipeline 20, or the heating lances 28, the device 10 according to the invention can therefore be operated such that a temperature of the fluid, in particular of liquid sulfur, at the outlet end 22 of the pipeline 20 is immediately above a temperature range in which the fluid solidifies. In the example of liquid sulfur, the device 10 according to the invention makes it possible to cool the liquid sulfur to a temperature of 125° C. at the outlet end 22. This is possible with the device 10 according to the invention even though the solidification temperature or freezing temperature of sulfur lies in a range between 117° C. and 119° C. A temperature of 125° C. for the liquid sulfur is optimal in order to subsequently pastillate the liquid sulfur using a droplet former.

The illustration of FIG. 2 shows the device 10 according to the invention as seen from the side. It shows that the redirecting sections 24 of the pipeline 20 are arranged outside the cooling chamber 12, as is evident also from FIG. 3. The U-shaped redirecting sections 24 arranged on the left of FIG. 2 are each flange-connected to straight sections of the pipeline 20 such that they can easily be removed for cleaning or inspection purposes. Thus, only straight sections of the pipeline 20 are arranged within the cooling chamber 12. Overall, the pipeline 20 follows a sinuous path, wherein, as stated, only the straight sections of the pipeline 20 are arranged within the cooling chamber 12.

The illustration of FIG. 2 shows the pipelines 30 which serve for supplying hot steam or hot water to the heating lances 28.

The illustration of FIG. 3 shows a plan view of the section plane A-A in FIG. 2. It shows part of the pipeline 20, specifically that part which connects to the inlet end 18 of the pipeline. Proceeding from the inlet end 18, the fluid to be cooled is first redirected through 90° and arrives in a first straight section 36 of the pipeline 20. This straight section 36 is arranged in the cooling chamber 12 and is provided with cooling fins 26 on its outer periphery. Proceeding from the straight section 36, the fluid then arrives in the redirecting sections 24, is redirected through 180° and arrives thence in another straight section 38 of the pipeline 20, which is also provided with cooling fins 26 on its outer periphery. Outside the cooling chamber 12, the fluid is then redirected upward, that is to say out of the plane of the drawing, see also FIG. 2, which is however not shown in FIG. 3.

A first heating lance 40 is shown within the straight section 26, and another heating lance 42 is shown within the straight section 38. The heating lances 40, 42 each have multiple baffles 44 and 46 which are spaced apart from one another. The heating lances 40, 42 differ in the arrangement of the baffles 44, 46. Specifically, the baffles 44 of the heating lance 40 are oriented at an angle α counter to the flow which, in FIG. 3, runs from right to left in the straight section 36. This angle α is advantageously between 30° and 60°, and is in particular 45°. The baffles 44 agitate the fluid within the section 36 of the pipeline 20, and in particular produce a turbulent flow of the fluid within the section 36. This improves the heat transfer both between the fluid and the section 36 of the pipeline 20, and also between the fluid and the heating lance 40 or the baffles 44.

The baffles 46 of the heating lance 42 are also oriented counter to the flow which, in FIG. 3, runs from left to right in the section 38 of the pipeline 20. The angle β, which like the angle α is measured counterclockwise with respect to the respective heating lance 40, 42, is however in this case between 120° and 150°, in particular 135°. As a result, however, both in section 36 and in section 38 of the pipeline 20, the fluid is incident on the baffles 44, 46 at an angle between 30° and 60°, and in particular 45°.

FIG. 3 further shows that the regions of the pipeline 20 outside the cooling chamber 12 are respectively provided with flanges 48 and 50. In FIG. 3, the flanges 48 are to the right of the cooling chamber 12 and the flanges 50 are to the left of the cooling chamber 12. Between the flanges 48, 50 there is in each case a straight section 36, 38 of the pipeline 20. Matching flanges 52 and, respectively, 54 of the heating lances 42 and 40 can be attached to the flanges 48. This makes it possible for the heating lances 40, 42 to be straight and to be inserted into the pipeline 20 and secured there in a simple manner.

The flanges 50 serve to attach the redirecting sections 24.

Detaching the redirecting sections 24 and also removing the heating lances 40, 42 from the pipeline 20 makes it particularly simple to maintain, and in particular clean, the pipeline.

The illustration of FIG. 4 shows the device 10 of FIG. 1 in a partially dismantled state. Specifically, the side walls, the lid and the base of the cooling chamber 12 have been removed, and also the pipeline 30 and the heating lances are not shown. A total of 10 straight sections of the pipeline 20 are arranged within the cooling chamber 12, all of these straight sections being provided with cooling fins 26. As seen looking up from below, two straight sections are arranged in the lowest layer, and in the following layer thereabove three straight sections are arranged next to one another. This is followed by another two straight sections thereabove, and the topmost layer again has three straight sections of the pipeline 20 arranged horizontally next to one another. This arrangement is thus characterized in that the straight sections of the pipeline 20 are arranged offset above one another. This allows the cooling air to pass through around the straight pipe sections or between the cooling fins 26, thus ensuring a very good transfer of heat between the cooling air and the cooling fins 26. The straight sections of all layers are connected in series to one another. This establishes a single, non-branched flow path through the cooling chamber 12.

As can be seen in FIG. 4, only the straight sections of the pipeline 20 are arranged within the cooling chamber 12; by contrast the redirecting sections 24 are each arranged without the cooling chamber 12.

The illustration of FIG. 5 shows the heating lance 40 of FIG. 3. The heating lance 40 has the flange 54 by way of which it is attached (see FIG. 3) to the flange 48 of the pipeline 20. The heating lance 40 has a U-shaped heating line 60 with two legs that are spaced apart from one another. The baffles 44—which, as already stated, are oriented counter to the flow—are arranged between the legs of the heating line 60. The heating lines 60 is provided with a connection flange 62 at the free end of each of its two legs. The connection flanges 62 are connected to the pipeline 30 (see FIG. 1 and FIG. 2) in order to supply the heating line 60 with hot water or hot steam.

The illustration of FIG. 6 is a plan view of the heating lance 42 from FIG. 3. As already stated, the design of the heating lance 42 is identical to that of the heating lance 40, apart from the arrangement of the baffles 46. Like the baffles 44 of the heating lance 40, the baffles 46 are arranged between the legs of the heating line 60 and are for example welded or soldered thereto. The only difference is the angle enclosed by the baffles 44 or 46 and the respective heating line 60, such that the baffles 44, 46 are always oriented counter to the flow of the fluid in the associated section of the pipeline 20.

The illustration of FIG. 7 shows the heating lance 40 of FIG. 5 from above.

FIG. 8 is a side view of the heating lance 40 of FIGS. 5 and 7. This view shows that the baffles 44 are arranged between the legs of the heating line 60. The baffles 44 are for example soldered or welded to the heating line 60, thus producing a good transfer of heat between the heating line 60 and the baffles 44. The baffles 44, just like the baffles 46 of the heating lance 42, thus serve not only to generate a turbulent flow in the pipeline 20, but also simultaneously to transfer the heat energy of the heating line 60 to the fluid flowing in the pipeline 20.

The illustration of FIG. 9 shows, schematically, an apparatus 62 for pastillating sulfur. The inventive device 10 for cooling liquid sulfur is part of this apparatus 62. Liquid sulfur is provided by a device 64, which is not shown in greater detail in FIG. 9. This liquid sulfur has a temperature of approximately 150° C. The liquid sulfur is conveyed, by means of a pump 66, to the device 10 according to the invention. A temperature of 150° C. for the liquid sulfur is too high for optimal operation of a pastillation device 68. The optimal temperature for the liquid sulfur is 125° C., in order to be able to ensure good pastille quality and high throughput through the pastillation device 68. For that reason, the liquid sulfur is fed via the device 10 in order to cool the liquid sulfur down to a temperature of 125° C. In that context, the temperature of the liquid sulfur upstream of the device 10 is measured at a point 70 upstream of the device 10, and at another point 72 downstream of the device 10. As already described, the device 10 has the cooling chamber 12 through which the pipeline 20 is routed. A fan 74 passes cooling air through the cooling chamber 12, from bottom to top in FIG. 9. The fan 74 is driven by a motor 76 and draws in the cooling air via an air filter 78. A flap 80 is arranged above the cooling chamber 12 and serves to optionally reduce or block a cooling air flow through the cooling chamber 12.

As already stated, heating lances are arranged in the straight sections of the pipeline 20 and serve, when necessary, to heat the liquid sulfur within the pipeline 20. A supply of hot steam to these heating lances, and the removal of the hot steam away from the heating lances, is indicated merely schematically in FIG. 9 by the arrows 82, 84. The exact construction of the heating lances and the pipeline 30 for supplying hot steam or hot water has already been described with reference to FIGS. 1 and 2.

Downstream of the device 10, the liquid sulfur that has now been cooled to a temperature of 125° C. is conveyed by means of another pump 86 to a droplet former 88. In that context, the pump 86 is not absolutely necessary and can be omitted. The droplet former 88 has a rotating, perforated outer shell 90 and a nozzle strip 92 that bears against the inside of the outer shell 90. The nozzle strip 92 presses the liquid sulfur against the rotating outer shell 90 such that the rotating outer shell 90 produces droplets of the liquid sulfur. These liquid sulfur droplets are deposited onto a circulating steel belt 94 that passes around two shells 98 and 100 in the direction of the arrow 96. Heating ducts 102 are provided within the droplet former 88 in order to keep the droplet former 88—and especially the liquid sulfur therein—at a temperature of approximately 125°, in order to thus prevent the liquid sulfur already solidifying inside the droplet former 88.

The liquid sulfur droplets deposited on the steel belt 94 solidify on the steel belt 94 as they are transported on the upper strand of the steel belt 94, from left to right in FIG. 9. To that end, the steel belt 94 is cooled from below by means of spray nozzles 104 and 106. At the return shell 100 (on the right in FIG. 9), the liquid sulfur droplets have solidified to pastilles and can be removed from the steel belt in the region of the return shell 100 by means of a discharge knife 108, and are then conveyed, as indicated by an arrow 110, to a further processing step, for example packing. A hood 112 is arranged above the droplet former 88 and above the steel belt 94, in order to ensure constant temperatures above the steel belt 94.

Since the liquid sulfur is supplied to the droplet former 88 at a temperature of 125° C., the droplet former can operate in the optimal temperature range and the pastillation device 68 can be operated at high throughput while at the same time achieving a very good pastille quality.

In order to prevent blocking of the device 10 and still be able to supply the liquid sulfur to the droplet former 88 at a temperature of 125° C., the temperature is measured in the pipeline 20, at least at the point 72 downstream of the device 10. If the temperature of the liquid sulfur at the point 72 drops below a predefined value, for example 125° C., a control unit (not shown) causes the heating lances in the pipeline 20 to be charged with heating steam in order to as quickly as possible bring the liquid sulfur within the pipeline 20 back up to a temperature at which there is no risk of solidifications within the pipeline 20. At the same time, the control unit (not shown) can for example also influence the quantity of cooling air by controlling the motor of the fan 74 and/or by adjusting the flap 80. The advantage of the heating lines within the pipeline 20, provided in accordance with the invention, is however that it is possible to very quickly control the temperature of the liquid sulfur in the pipeline 20, and that it is even possible to re-melt existing solidifications within the pipeline 20.

In the illustration of FIG. 9, the inventive device 10 for cooling liquid sulfur is surrounded by a dashed line. This is intended to indicate that the device 10 forms a module that can be separated from the apparatus 62. It is indeed possible to provide a superordinate process computer in order to control the apparatus 62, which then also controls or regulates the device 10. However, in the embodiment shown, the device 10 is provided with its own central control unit 120 which ultimately controls or regulates the operation of the device 10 and ensures that a fluid flowing into the device 10 leaves the device 10 again with a predefined temperature.

To that end, the control unit 120 obtains input signals from the temperature sensors 70, 72. The control unit 120 processes these temperature signals and, on the basis of these temperature signals, controls the motor 76 that powers the cooling air fan 74. Furthermore, the control unit 120 also controls the flap 80 on the downstream side of the cooling chamber 12. This allows the control unit 120 to control a cooling air stream through the cooling chamber 12, on the basis of the temperatures measured by the temperature sensors 70, 72. In normal operation, the temperature at the sensor 72, that is to say at the outlet of the device 10, is regulated simply by changing the quantity of cooling air flowing through the cooling chamber 12, that is to say by adjusting the motor 76 and the flap 80. A heating device in the pipeline in the cooling chamber 12, which may have electrical heating rods or heating lances as described in the context of the exemplary embodiment of FIGS. 1 to 8, is activated only when the temperature measured by the sensor 72 drops below a predefined temperature. These heating lines designed in the form of heating lances are charged with hot steam, as indicated purely schematically in FIG. 9 by means of the arrows 82, 84. The central control unit 120 also controls the supply of hot steam, the requisite valves and other means not being shown in FIG. 9 for the sake of clarity.

However, by virtue of the provision of the central control unit 120, the invention provides a device 10 which can be installed as a module and which does not require a superordinate process computer in order to output a fluid at a predefined temperature.

The invention claimed is:

1. A device for cooling a fluid that solidifies in a predefined temperature range, in particular a melt, having a cooling chamber for receiving or conveying a coolant, at least one pipeline for the fluid, at least a section of which is arranged within the cooling chamber, wherein at least one heating device is arranged within the pipeline, wherein the pipeline follows a sinuous course and wherein the pipeline has multiple straight sections through the cooling chamber.

2. The device as claimed in claim 1, wherein the heating device is designed as a heating line.

3. The device as claimed in claim 2, wherein the heating line has a U-shaped profile and is designed as a heating lance that can be inserted into the pipeline.

4. The device as claimed in claim 1, wherein the heating device is designed as an electric heating rod.

5. The device as claimed in claim 1, wherein the heating device is provided with baffles.

6. The device as claimed in claim 5, wherein the heating device is a U-shaped heating line and the baffles are arranged between legs of the U-shaped heating line.

7. The device as claimed in claim 5, wherein the baffles are arranged such that the fluid is incident on the baffles at an angle between 30 degrees and 60 degrees.

8. The device as claimed in claim 5, wherein the baffles are welded to, soldered to or formed integrally with the heating device.

9. The device as claimed in claim 1, wherein the multiple straight sections in the cooling chamber are arranged in multiple layers one above the other, wherein at least one layer is formed from at least two straight pipe sections arranged next to one another, and wherein the pipe sections of adjacent layers are arranged offset with respect to one another.

10. The device as claimed in claim 1, wherein at least certain sections of the pipeline are provided externally with cooling fins.

11. The device as claimed in claim 1, wherein the coolant is air.

12. The device as claimed in claim 1, wherein the heating line is supplied with hot water or steam.

13. The device as claimed in claim 1, wherein the pipeline is provided with at least one flange for attaching a flange of the heating device.

14. The device as claimed in claim 7, wherein the angle is 45 degrees.

15. A fluid cooling apparatus comprising:
a cooling chamber for cooling a fluid that solidifies in a predefined temperature range;
a pipeline having an interior passageway for conveying the fluid into and out of the cooling chamber, the pipeline having a plurality of first sections disposed within the cooling chamber, the first sections separated by at least one second section disposed outside of the cooling chamber; and
a heating device positioned adjacent the interior passageway of the pipeline for heating the fluid in the pipeline.

16. The fluid cooling apparatus of claim 15, wherein the pipeline is sinuous.

17. The fluid cooling apparatus of claim 15, wherein the heating device has baffles therein.

* * * * *